United States Patent [19]

Carpenter et al.

[11] Patent Number: 6,081,874
[45] Date of Patent: Jun. 27, 2000

[54] NON-UNIFORM MEMORY ACCESS (NUMA) DATA PROCESSING SYSTEM THAT SPECULATIVELY ISSUES REQUESTS ON A NODE INTERCONNECT

[75] Inventors: Gary Dale Carpenter, Pflugerville; Mark Edward Dean; David Brian Glasco, both of Austin; Richard Nicholas Iachetta, Jr., Pflugerville, all of Tex.

[73] Assignee: International Business Machines Corporation, Armonk, N.Y.

[21] Appl. No.: 09/162,828

[22] Filed: Sep. 29, 1998

[51] Int. Cl.[7] ................................................. G06F 13/00
[52] U.S. Cl. .......................... 711/141; 711/118; 711/130; 711/144; 711/167; 711/146
[58] Field of Search ................................... 711/141, 146, 711/167, 122, 149, 144, 118, 130

[56] References Cited

U.S. PATENT DOCUMENTS

| 5,603,010 | 2/1997 | Dodd et al. | 711/167 |
| 5,623,628 | 4/1997 | Brayton et al. | 711/141 |
| 5,673,413 | 9/1997 | Deshpande et al. | 711/141 |
| 5,835,950 | 11/1998 | Cho et al. | 711/144 |

*Primary Examiner*—John A. Follansbee
*Assistant Examiner*—Nabil El-Hady
*Attorney, Agent, or Firm*—Casimer K. Salys; Felsman, Bradley, Vaden, Gunter & Dillon, LLP

[57] ABSTRACT

A non-uniform memory access (NUMA) data processing system includes a node interconnect to which at least a first processing node and a second processing node are coupled. The first and the second processing nodes each include a local interconnect, a processor coupled to the local interconnect, a system memory coupled to the local interconnect, and a node controller interposed between the local interconnect and the node interconnect. In order to reduce communication latency, the node controller of the first processing node speculatively transmits request transactions received from the local interconnect of the first processing node to the second processing node via the node interconnect. In one embodiment, the node controller of the first processing node subsequently transmits a status signal to the node controller of the second processing node in order to indicate how the request transaction should be processed at the second processing node.

18 Claims, 7 Drawing Sheets

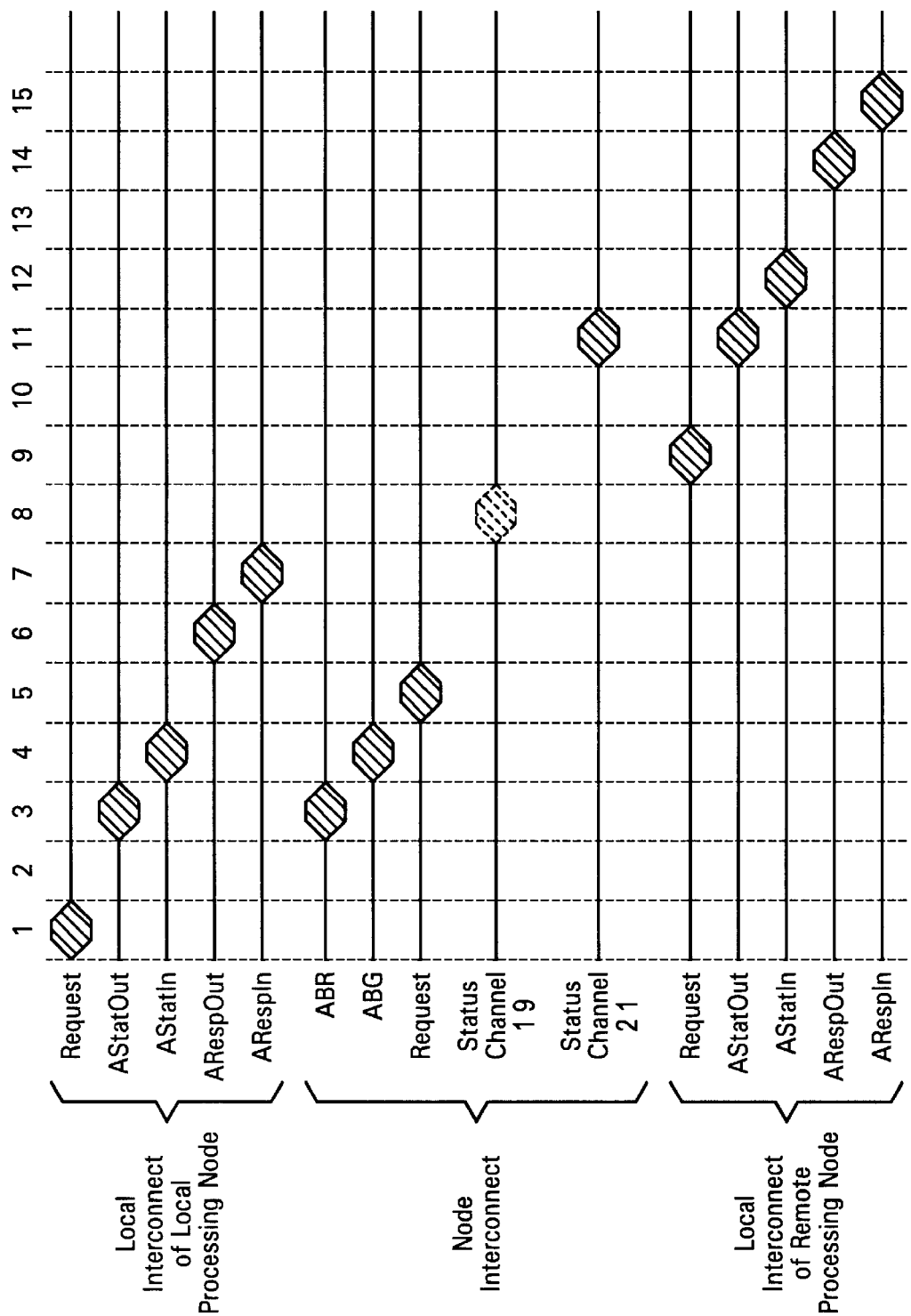

NON-UNIFORM MEMORY ACCESS (NUMA) DATA PROCESSING SYSTEM THAT SPECULATIVELY ISSUES REQUESTS ON A NODE INTERCONNECT

BACKGROUND OF THE INVENTION

1. Technical Field

The present invention relates in general to a method and system for data processing and, in particular, to a non-uniform memory access (NUMA) data processing system and method of communication in a NUMA data processing system. Still more particularly, the present invention relates to a NUMA data processing system and method of communication in which requests are speculatively issued on a node interconnect to reduce communication latency.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the most common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases. SMP computer systems also do not scale well from the standpoint of manufacturing efficiency. For example, although some components can be optimized for use in both uniprocessor and small-scale SMP computer systems, such components are often inefficient for use in large-scale SMPs. Conversely, components designed for use in large-scale SMPs are impractical for use in smaller systems from a cost standpoint.

As a result, an MP computer system topology known as non-uniform memory access (NUMA) has emerged as an alternative design that addresses many of the limitations of SMP computer systems at the expense of some additional complexity. A typical NUMA computer system includes a number of interconnected nodes that each include one or more processors and a local "system" memory. Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes. The complexity of cache coherent NUMA (CC-NUMA) systems is attributable in large measure to the additional communication required for hardware to maintain data coherency not only between the various levels of cache memory and system memory within each node but also between cache and system memories in different nodes. NUMA computer systems do, however, address the scalability limitations of conventional SMP computer systems since each node within a NUMA computer system can be implemented as a smaller SMP system. Thus, the shared components within each node can be optimized for use by only a few processors, while the overall system benefits from the availability of larger scale parallelism while maintaining relatively low latency.

A principal performance concern with CC-NUMA computer systems is the latency associated with communication transactions transmitted via the interconnect coupling the nodes. Because all data accesses can potentially trigger a coherency or data request transaction on the nodal interconnect, the latency associated with the transmission of requests to remote nodes and transmission of the responses from the remote nodes can dramatically influence overall system performance. As should thus be apparent, it would be desirable to provide a CC-NUMA computer system having low inter-node communication latency.

SUMMARY OF THE INVENTION

A non-uniform memory access (NUMA) data processing system includes a node interconnect to which at least a first processing node and a second processing node are coupled. The first and the second processing nodes each include a local interconnect, a processor coupled to the local interconnect, a system memory coupled to the local interconnect, and a node controller interposed between the local interconnect and the node interconnect. In order to reduce communication latency, the node controller of the first processing node speculatively transmits request transactions received from the local interconnect of the first processing node to the second processing node via the node interconnect. In one embodiment, the node controller of the first processing node subsequently transmits a status signal to the node controller of the second processing node in order to indicate how the request transaction should be processed at the second processing node.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a timing diagram of an exemplary communication scenario in accordance with the inter-node communication methodology depicted in FIGS. 3A and 3B.

DETAILED DESCRIPTION OF ILLUSTRATIVE EMBODIMENT

System Overview

Figure 1:
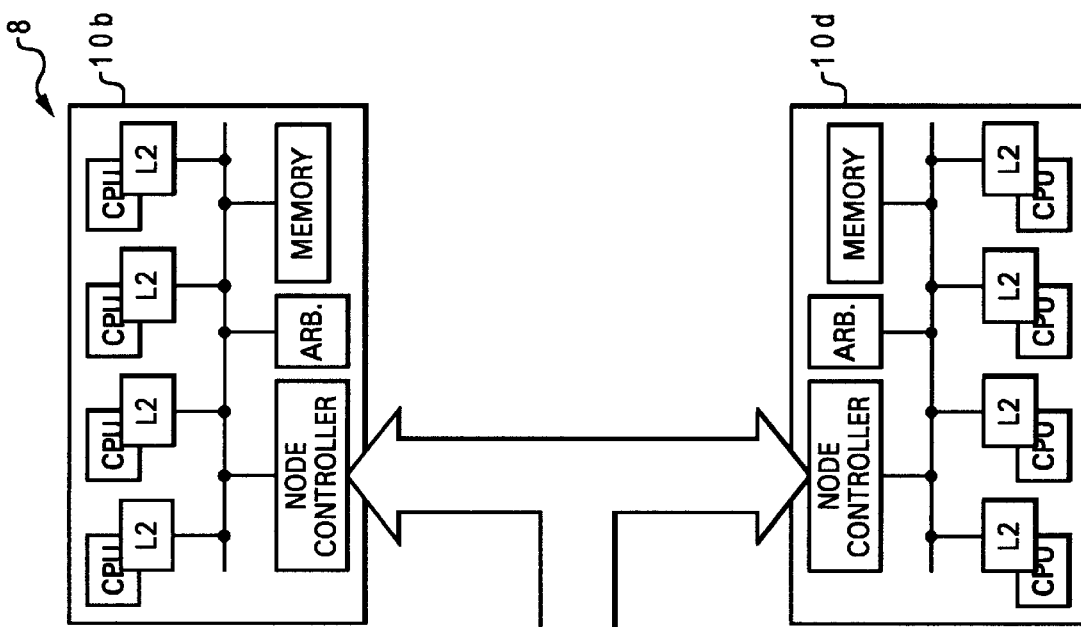
FIG. 1 depicts an illustrative embodiment of a NUMA computer system with which the present invention may advantageously be utilized.
Figure 1:
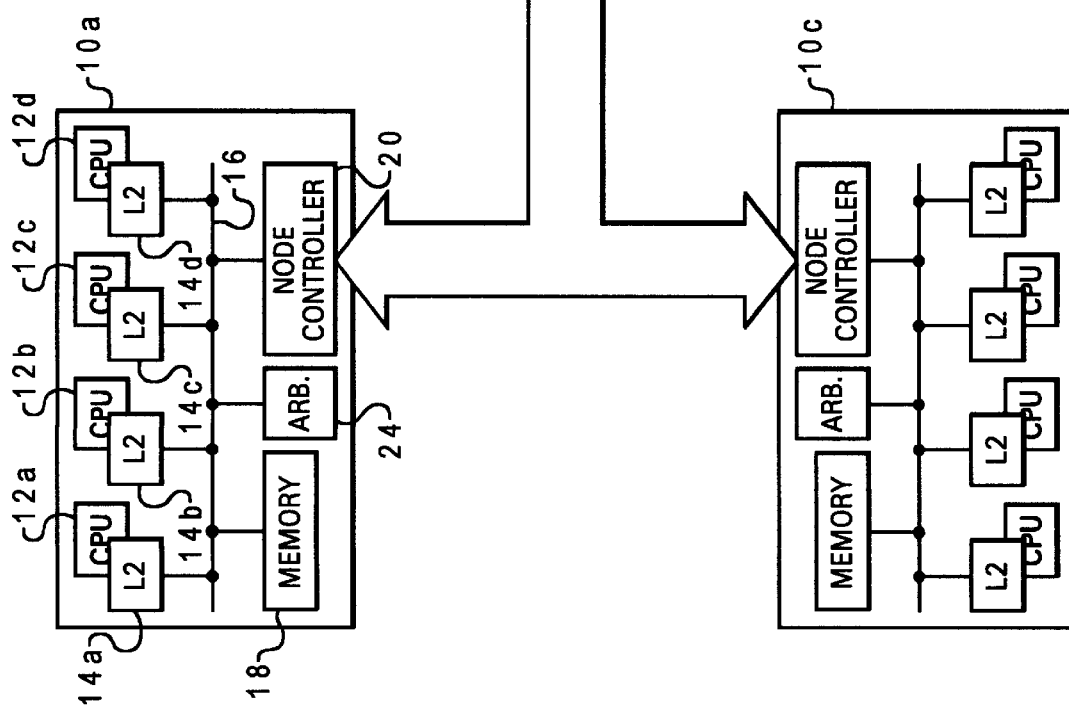

With reference now to the figures and in particular with reference to FIG. 1, there is depicted an illustrative embodiment of a NUMA computer system in accordance with the present invention. The depicted embodiment can be realized, for example, as a workstation, server, or mainframe computer. As illustrated, NUMA computer system 8 includes a number (N) of processing nodes 10a–10d, which are interconnected by node interconnect 22. Processing nodes 10a–10d each include at least one, and up to M, processors 12. Processors 12a–12d are preferably identical and may comprise a processor within the PowerPC™ line of processors available from International Business Machines (IBM) Corporation of Armonk, N.Y. In addition to the registers, instruction flow logic and execution units utilized to execute program instructions, each of processors 12a–12d also includes an on-chip level one (L1) cache (not illustrated), which together with a respective one of level two (L2) caches 14a–14d is utilized to stage data to the associated processor 12 from system memories 18. In other words, the L1 caches and L2 caches 14a–4d function as intermediate storage between the system memories 18 and processors 12 that temporarily buffer data that are likely to be accessed by the associated processor 12. L2 caches 14 typically have a much larger storage capacity than the L1 caches, but at a longer access latency. For example, L2 caches 14a–14d may have a storage capacity of 1–16 megabytes (MB), while the on-chip L1 caches may have a storage capacity of 8–32 kilobytes. Although L2 caches 14a–14d are illustrated in FIG. 1 as external to processors 12, it should be understood that L2 caches 14a–14d could alternatively be incorporated within the associated processor 12 as an additional level of on-chip cache memory. Furthermore it should be understood that one or more additional levels of cache memory (L3, L4, etc.) could be utilized to provide additional data storage. In the following discussion, each processor 12 and its associated cache hierarchy (L1, L2, etc.) is considered to be a single snooper.

As shown, processing nodes 10a–10d further include a respective node controller 20, which, together with system memory 18 and L2 caches 14a–14d, is coupled to local interconnect 16. Each node controller 20 serves as a local agent for remote processing nodes 10 by performing at least two functions. First, each node controller 20 snoops the associated local interconnect 16 and facilitates the transmission of local communication transactions to remote processing nodes 10. Second, each node controller 20 snoops communication transactions on node interconnect 22 and masters relevant communication transactions on the associated local interconnect 16. Communication on each local interconnect 16 is controlled by an arbiter 24. As discussed further below, arbiters 24 regulate access to local interconnects 16 based on bus request signals generated by processors 12 and compile coherency responses for snooped communication transactions on local interconnects 16.

Of course, NUMA computer system 8 can further include additional devices that are not necessary for an understanding of the present invention and are accordingly omitted in order to avoid obscuring the present invention. For example, each node 10 may also support I/O devices (e.g., a display device, keyboard, or graphical pointer), non-volatile storage for storing an operating system and application software, and serial and parallel ports for connection to networks or attached devices.

Memory Organization

All of processors 12 in NUMA computer system 8 share a single physical memory space, meaning that each physical address is associated with only a single location in one of system memories 18. Thus, the overall contents of the system memory, which can generally be accessed by any processor 12 in NUMA computer system 8, can be viewed as partitioned between the four system memories 18. For example, for the illustrative embodiment of the present invention shown in FIG. 1, processors 12 address a 16 gigabyte (GB) address space including both a general purpose memory area and a reserved area. The general purpose memory area is divided into 500 MB segments, with each of the four processing nodes 10 being allocated every fourth segment. The reserved area, which may contain approximately 2 GB, includes system control and peripheral memory and I/O areas that are each allocated to a respective one of processing nodes 10.

For purposes of the present discussion, the processing node 10 that stores a particular datum in its system memory 18 is said to be the home node for that datum; conversely, others of processing nodes 10–10d are said to be remote nodes with respect to the particular datum.

Memory Coherency

Because data stored within each system memory 18 can be requested, accessed, and modified by any processor 12 within NUMA computer system 8, NUMA computer system 8 implements a cache coherency protocol to maintain coherency both between caches in the same processing node and between caches in different processing nodes. Thus, NUMA computer system 8 is properly classified as a CC-NUMA computer system. The cache coherence protocol that is implemented is implementation-dependent and may comprise, for example, the well-known Modified, Exclusive, Shared, Invalid (MESI) protocol or a variant thereof. Hereafter, it will be assumed that L1 caches, L2 caches 14b, and arbiters 24 implement the conventional MESI protocol, of which node controllers 20 recognize the M, S and I states and consider the E state to be merged into the M state for correctness. That is, node controllers 20 assume that data held exclusively by a remote cache has been modified, whether or not the data has actually been modified.

Interconnect Architecture

Local interconnects 16 and node interconnect 22 can each be implemented with any broadcast or point-to-point interconnect architecture, for example, a bus or crossbar switch. However, in the embodiment described below, each of local interconnects 16 and node interconnect 22 is implemented as a hybrid-bus architecture governed by the 6x communication protocol developed by IBM Corporation.

Figure 2A:
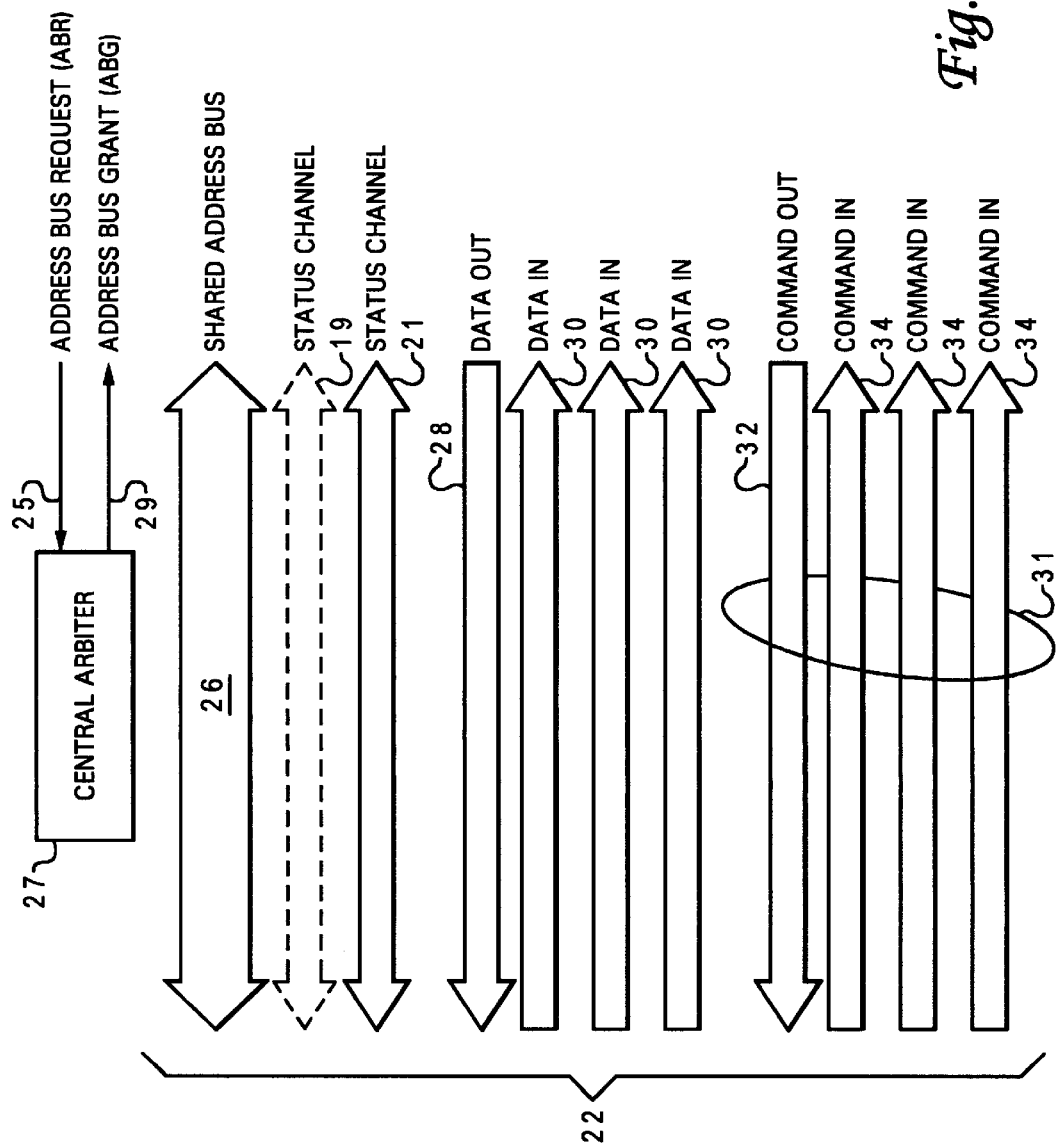
FIG. 2A is a more detailed block diagram of an interconnect architecture utilized in the illustrative embodiment shown in FIG. 1.

Referring now to FIG. 2A, an exemplary embodiment of node interconnect 22 within NUMA computer system 8 is illustrated from the perspective of one of processing nodes 10. As shown, the illustrated embodiment of node interconnect 22 includes separate (i.e., non-multiplexed) address and data portions, which are decoupled to permit split transactions. The address portion of node interconnect 22 is implemented as a shared address bus 26, access to which is controlled by central arbiter 27. A node controller 20 requests access to shared address bus 26 by asserting its respective address bus request (ABR) signal 25 and is informed of a grant of access by central arbiter 27 through the assertion of its respective address bus grant (ABG) signal 29. Each node controller 20 coupled to node interconnect 22 also snoops all communication transactions on shared address bus 26 to support memory coherency, as discussed further below. A summary of relevant signal names and definitions for shared address bus 26 is given in Table I.

TABLE I

| Signal Name | No. of lines | Description |
|---|---|---|
| Address <0:7> | 8 | Address bus modifiers defining attributes of a communication transaction for coherency, write thru, and protection |
| Address <8:15> | 8 | Tag used to identify a communication transaction |
| Address <16:63> | 48 | Address signals that indicate the physical, virtual or I/O address in a request |
| AParity <0:2> | 3 | Indicates parity for address bits <0:63> |
| TDescriptors | 10 | Indicate size and type of communication transaction |

The utilization of shared address bus 26 is preferably enhanced by implementing shared address bus 26 as a pipelined bus, meaning that a subsequent transaction can be sourced by a processing node 10 prior to the master of a previous communication transaction receiving coherency responses from each of the other processing nodes 10. Importantly, shared address bus 26 has a fixed latency, meaning that the interval between a communication transaction being issued on shared address bus 26 and the receipt of that communication transaction by one of processing nodes 10 is the same for all communication transactions.

Associated with shared address bus 26 are at least one, and depending upon the implementation possibly two, shared, time-multiplexed status channels 19 and 21, which are utilized to support the speculative issue of communication transactions on shared address bus 26, as discussed further below. In implementations in which communication transactions are speculatively issued on shared address bus 26 aggressively (i.e., early in the transaction on a processing node's local interconnect 16), node interconnect 22 includes both status channel 19 and status channel 21. In other implementations in which communication transactions are speculatively issued on shared address bus 26 less aggressively (i.e., later on in the transaction on the processing node's local interconnect 16), node interconnect 22 will include status channel 21, but not status channel 19. If present, each of status channels 19 and 21 is allocated to the source processing node of a request transaction a fixed interval (different for each channel) after the request transaction is issued on shared address bus 26. Status channel 19 is utilized to provide the target processing node 10 of a speculatively issued transaction with a preliminary verify/kill indication based upon whether or not snoopers within the source processing node 10 successfully received the communication transaction via local interconnect 16. Status channel 21, on the other hand, is utilized to provide the target processing node 10 with either a late kill signal or the coherency response received by the communication transaction at the source processing node.

Node interconnect 22 further includes a data portion, which could be implemented as a shared bus as discussed above, but is preferably implemented as a distributed switch having N-1 (e.g., 4-1=2) data-in channels 34 and a single data-out channel 32 for each processing node 10. The data output by a processing node 10 on data-out channel 32 are transmitted to all of processing nodes 10, and each processing node 10 receives data from each of the other processing nodes 10 via data-in channels 34. By implementing the data portion of node interconnect 22 in this manner rather than as a shared bus, deadlocks are avoided and data bandwidth is advantageously increased. The relevant signal names and definitions for each channel within the preferred embodiment of the data portion of node interconnect 22 are summarized below in Table II.

TABLE II

| Signal Name | No. of lines | Description |
|---|---|---|
| Data <0:127> | 128 | Data lines used to carry data for read and write transactions |
| Data parity <0:15> | 16 | Indicate parity for data lines <0:127> |
| DTag <0:7> | 8 | Tag used to match a data packet with an address bus transaction |
| DValid <0:1> | 2 | Indicate if valid information is present on Data and DTag lines |

As indicated in Table II, to permit recipients of data packets to determine the communication transaction to which each data packet belongs, each data packet is identified with a transaction tag. This permits the timings of shared address bus 26 and the data portion of node interconnect 22 to be completely decoupled, meaning that no fixed timing relationship exists between address tenures and data tenures and that data tenures can be ordered differently than the corresponding address tenures. Those skilled in the art will appreciate that data flow control logic and associated flow control signals should be utilized to regulate use of the finite data communication resources.

Figure 2B:
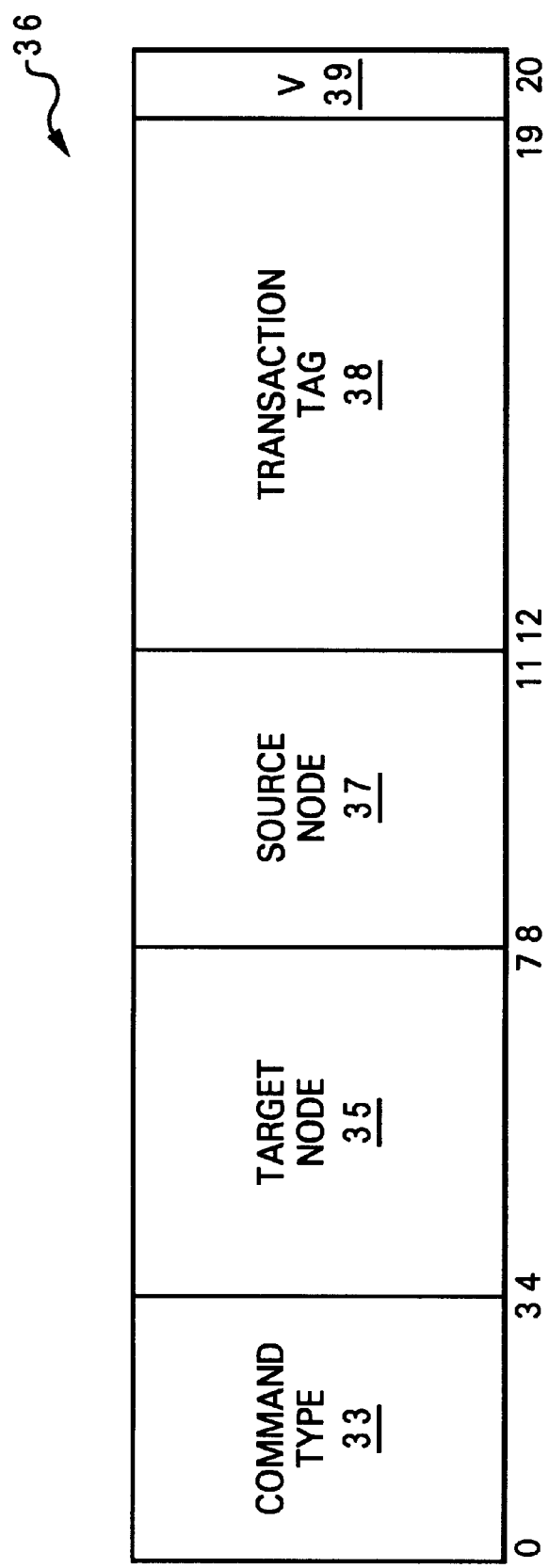
FIG. 2B depicts an illustrative embodiment of an I-command.

As illustrated in FIG. 2A, a preferred embodiment of node interconnect 22 also includes a high speed I-command channel 31. This sideband channel, like the data portion of node interconnect 22, is preferably implemented as a distributed switch including one output channel (command-out channel 32) and N-1 input channels (command-in channels 34) for each processing node 10. Channels 32 and 34 permit the communication of I-commands between processing nodes 10 without creating additional loading on the address or data portions of node interconnect 22. An exemplary embodiment of an I-command is shown in FIG. 2B. As illustrated, I-command 36 includes five (5) fields: a 4-bit command type field 33, an N-bit (e.g., 4-bit) target node field 35, an N-bit source node field 37, a transaction tag field 38, and a valid (V) field 39. Command type field 33 provides an encoded indication of the type of I-command 36. Some of the possible I-commands that can be encoded within type field 33 are listed below in Table III.

TABLE III

| I-command groups | I-command types | Meaning |
| --- | --- | --- |
| commands | 3rd node run | Run buffered transaction at third (target) node |
| | Error | Error detected in transaction |
| | Reissue | Reissue transaction to source node |
| coherency responses | Retry | Retry transaction -- usually for flow control reasons |
| | Modified intervention | Line is modified in cache and will be sourced to target node |
| | Shared | Line is held shared in cache |
| | Null | Line is invalid in cache |

For each type of I-command, the recipient is specified in target node field 35, the sending node is specified in source node field 37, and the transaction to which the I-command relates is specified within transaction tag field 38. The validity of I-command 36 is indicated by valid (V) field 39. Importantly, the I-commands issued by processing nodes 10 via I-command channel 31 do not have any necessary timing relationship with the address or data tenures of the associated communication transactions. And, because I-command channel 31 utilizes small packets and is non-blocking (i.e., use of I-command channel 31 by one processing node 10 does not inhibit or block usage by other processing nodes), I-commands can be transmitted at high speed between processing nodes 10.

Local interconnects 16 include three distinct components—an address portion, a data portion, and a coherency portion. The address portion of each local interconnect 16 is preferably implemented as described above with respect to shared address bus 26 of node interconnect 22. The data portion of each local interconnect 16 utilizes the same data signals listed above in Table II, but is preferably implemented as a shared data bus rather than a distributed switch (although either could be utilized) and may have a smaller bandwidth. In lieu of the I-command channel discussed above, the coherency portion of each local interconnect 16 includes signal lines coupling each attached snooper to the local arbiter 24. The signal lines within local interconnects 16 that are utilized for coherency communication are summarized below in Table IV.

TABLE IV

| Signal Name | No. of lines | Description |
| --- | --- | --- |
| AStatOut <0:1> | 2 | Encoded signals asserted by each bus receiver to indicate flow control or error information to arbiter |
| AStatIn <0:1> | 2 | Encoded signals asserted by arbiter in response to tallying the AStatOut signals asserted by the bus receivers |
| ARespOut <0:2> | 3 | Encoded signals asserted by each bus receiver to indicate coherency information to arbiter |
| ARespIn <0:2> | 3 | Encoded signals asserted by arbiter in response to tallying the ARespOut signals asserted by the bus receivers |

In contrast to the coherency responses transmitted between processing nodes 10 via I-command channel 31, coherency responses transmitted via the AResp and AStat lines of local interconnects 16 preferably have a fixed but programmable timing relationship with the associated address bus transactions. For example, the AStatOut votes, which provide an indication from each snooper whether a communication transaction on the local address bus was successfully received, may be required in the second cycle following receipt of a request on the local address bus. Arbiter 24 compiles the AStatOut votes and then issues the AStatIn vote a fixed but programmable number of cycles later (e.g., 1 cycle). Possible AStat votes are summarized below in Table V.

TABLE V

| AStat vote | Meaning |
| --- | --- |
| Null | Idle |
| Ack | Transaction accepted by snooper |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed above in Table III. In addition, the possible AResp votes include "ReRun," which is issued (usually by a node controller 20) to indicate that the snooped request has a long latency and that the source of the request will be instructed to reissue the transaction at a later time. Thus, in contrast to a retry response, a ReRun response makes the recipient of a transaction that voted ReRun (and not the originator of the transaction) responsible for causing the communication transaction to be reissued at a later time.

Node Controller

Figure 2C:
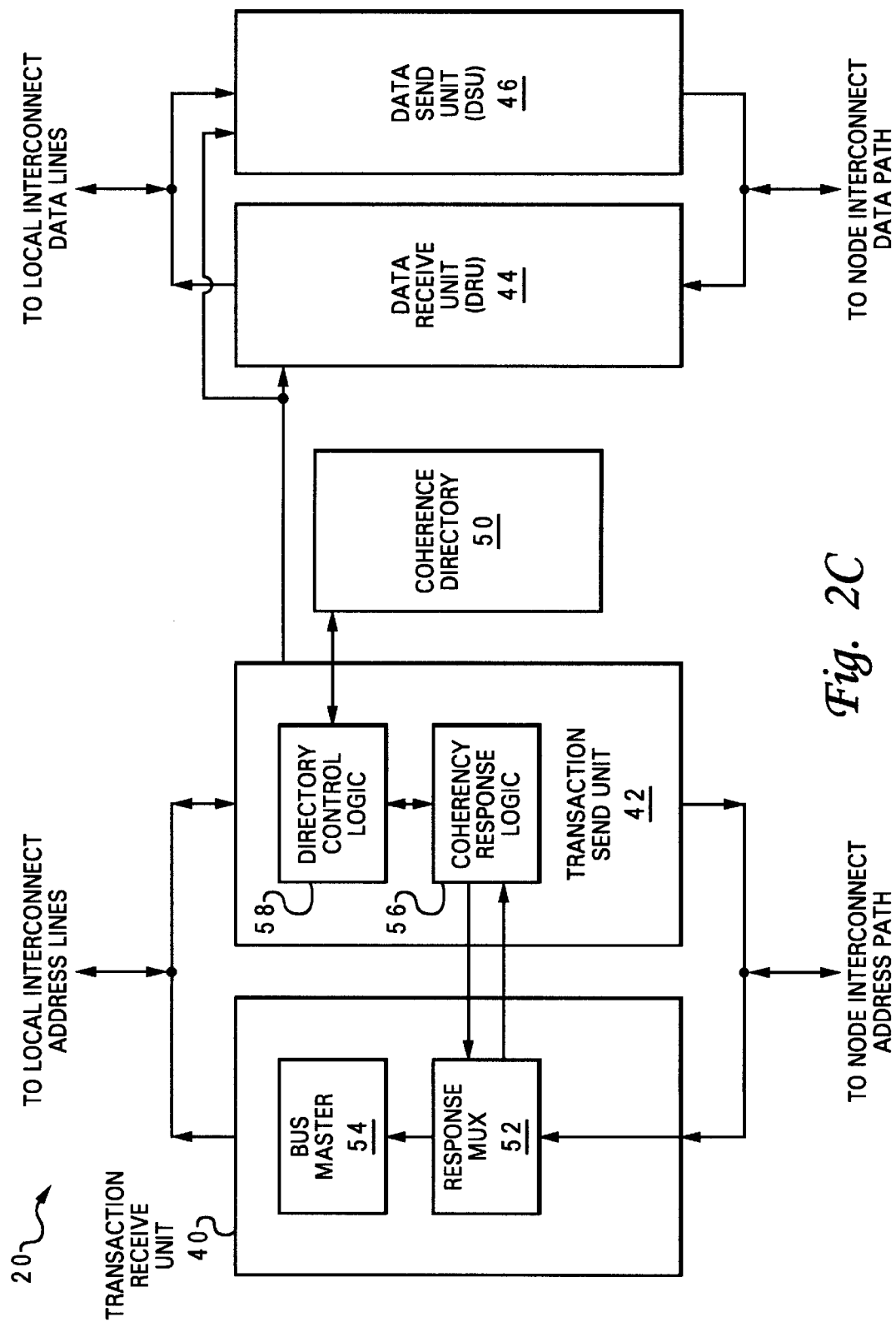
FIG. 2C is a more detailed block diagram of the node controller shown in FIG. 1.

Referring now to FIG. 2C, there is illustrated a more detailed block diagram of a node controller 20 in NUMA computer system 8 of FIG. 1. As shown in FIG. 2C, each node controller 20, which is coupled between a local interconnect 16 and node interconnect 22, includes transaction receive unit 40, transaction send unit 42, a data receive unit (DRU) 44, and a data send unit (DSU) 46. Transaction receive unit 40, transaction send unit 42, DRU 44 and DSU 46 can be implemented, for example, with field programmable gate arrays (FPGAs) or application specific integrated circuits (ASICs). As indicated, the address and data paths through node controller 20 are bifurcated, with address signals being processed by transaction receive unit 40 and transaction send unit 42 and data signals being processed by DSU 44 and DRU 46.

Transaction receive unit 40, which is so designated to indicate transaction flow off of node interconnect 22, is responsible for receiving I-commands from other nodes via I-command channel 31, accepting transactions from shared address bus 26 of node interconnect 22, issuing transactions on local interconnect 16, and forwarding responses to transaction send unit 42. Transaction receive unit 40 includes response multiplexer (mux) 52, which receives transactions from node interconnect 22 and passes selected transactions to both bus master 54 and coherency response logic 56 within transaction send unit 42. In response to receipt of a communication transaction from response multiplexer 52, bus master 54 can initiate a communication transaction on its local interconnect 16 that is the same as or different from the received communication transaction.

Transaction send unit 42, which as indicated by its nomenclature is a conduit for transactions flowing onto node interconnect 22, interacts with transaction receive unit 40 to process memory request transactions and issues commands to DRU 44 and DSU 46 to control the transfer of data between local interconnect 16 and node interconnect 22. Transaction send unit 42 also implements the selected (i.e., MSI) coherency protocol for node interconnect 22 with coherency response logic 56 and maintains coherence directory 50 with directory control logic 58.

Coherence directory 50 stores indications of the system memory addresses of data (e.g., cache lines) checked out to caches in remote nodes for which the local processing node is the home node. The address indication for each datum is stored in association with an identifier of each remote processing node having a copy of the datum and the coherency status of the datum at each such remote processing node. Possible coherency states for entries in coherency directory 50 are summarized in Table VI.

TABLE VI

| Coherence directory state | Possible state(s) in local cache | Possible states(s) in remote cache | Meaning |
| --- | --- | --- | --- |
| Modified (M) | I | M,E, or I | Cache line may be modified at a remote node with respect to system memory at home node |
| Shared (S) | S or I | S or I | Cache line may be held non-exclusively at remote node |
| Invalid (I) | M,E,S, or I | I | Cache line is not held by any remote node |
| Pending-shared | S or I | S or I | Cache line is in the process of being invalidated at remote nodes |
| Pending-modified | I | M,E, or I | Cache line, which may be modified remotely, is in process of being written back to system memory at home node, possibly with invalidation at remote node |

As indicated in Table VI, the knowledge of the coherency states of cache lines held by remote processing nodes is imprecise. This imprecision is due to the fact that a cache line held remotely can make a transition from S to I, from E to I, or from E to M without notifying the node controller 20 of the home node.

Inter-node Communication Methodology

Figure 3A:
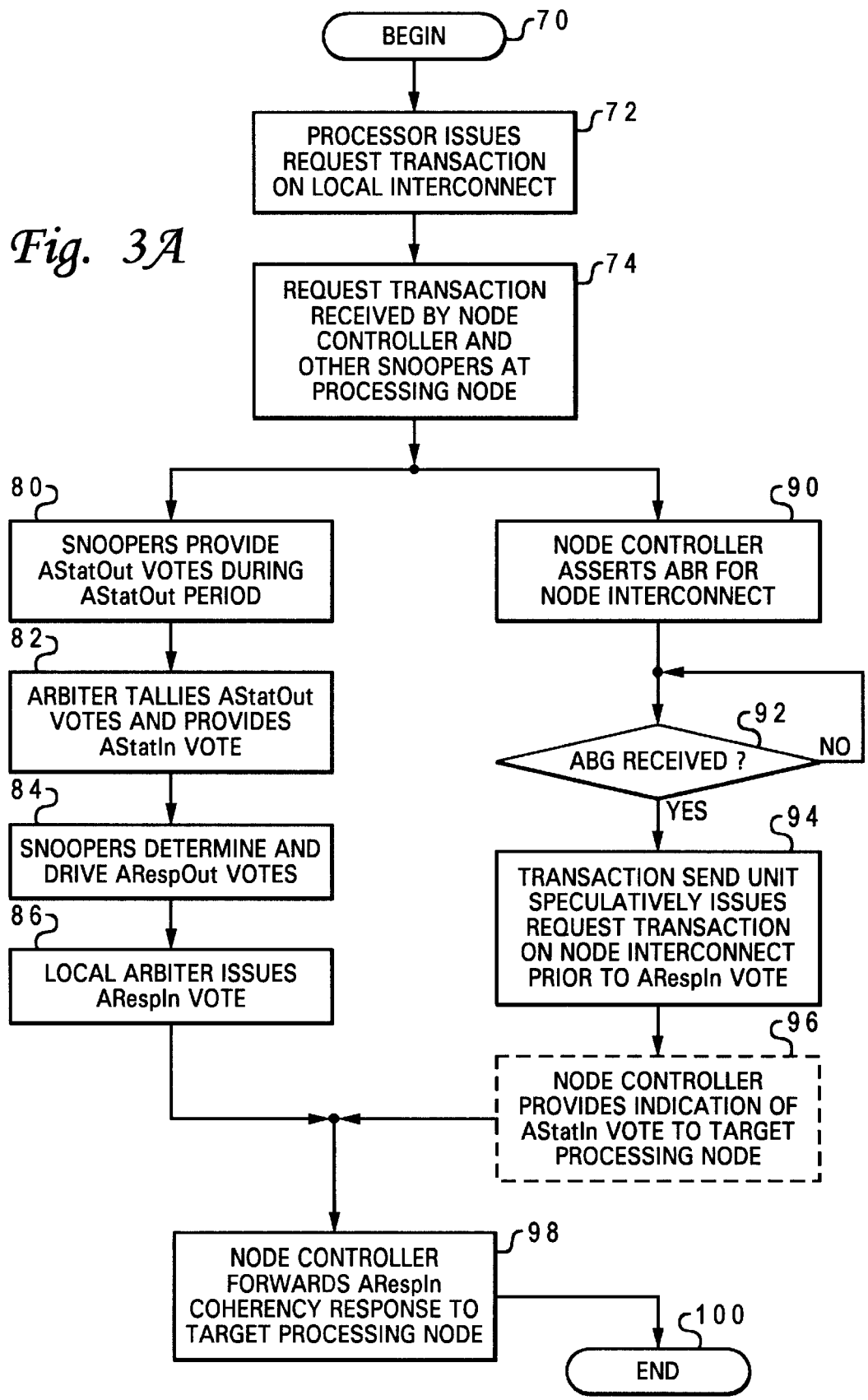
FIG. 3A is a high level logical flowchart of a method for speculatively issuing request transactions on a node interconnect in accordance with the present invention.

Referring now to FIG. 3A, there is illustrated a high level logical flowchart of an exemplary method for speculatively issuing request transactions on a node interconnect in accordance with the present invention. The timing relationship between the various steps in the method of FIG. 3A are discussed below with reference to the timing diagram given in FIG. 4. Referring first to FIG. 3A, the process begins at block 70 and thereafter proceeds to block 72, which depicts a processor 12, such as processor 12*a* of processing node 10*a*, issuing a request transaction (e.g., a read request) on its local interconnect 16. This request transaction is pictured in cycle 1 of FIG. 4. As shown at block 74 of FIG. 3, the request transaction is received by node controller 20 and the rest of the snoopers coupled to local interconnect 16 of processing node 10*a*. From block 74, the process shown in FIG. 3A passes to both blocks 80–86 and blocks 90–94 in parallel. That is, at least some of the steps illustrated at blocks 80–86 are performed concurrently with the steps illustrated at blocks 90–94.

Referring first to block 80, in response to receipt of the request transaction, each of the snoopers within processing node 10*a*, including node controller 20, decodes the request transaction and drives an appropriate vote during the AStatOut period (shown in cycle 3 of FIG. 4) to indicate whether or not the request transaction was successfully received, as discussed above. As indicated at block 82 and as shown in FIG. 4, arbiter 24 of processing node 10*a* compiles the AStatOut votes and issues an AStatIn vote during cycle 4.

Next, as illustrated at block 84 of FIG. 3A and in cycle 6 of FIG. 4, the snoopers drive their ARespOut coherency votes, which are compiled by arbiter 24 to generate the ARespIn coherency vote illustrated at block 86 and in cycle 7. The AStatIn and ARespIn votes that are generated in response to a request transaction can reflect one of four different processing scenarios. The first processing scenario occurs when the request transaction can be serviced locally within source processing node 10*a*, and remote processing nodes need not be notified or involved. This processing scenario can occur, for example, if source processing node 10*a* is the home node for requested data that is not held exclusively by a remote processing node 10 or if a cache in source processing node 10*a* has the requested data checked out from the home node in shared, modified or exclusive state. A second of the possible processing scenarios occurs when the request transaction cannot be processed locally at the present time (i.e., a snooper votes Retry for the transaction), and remote processing nodes need not be involved or notified. A third possible processing scenario occurs when the request transaction is Retried locally, and is required to be or is preferably made visible to remote processing nodes 10. An example of this third processing scenario occurs when a translation lookaside buffer (TLB) synchronization operation is requested and Retried at a source processing node 10. It is helpful in this situation to notify remote processing nodes 10 of an impending TLB synchronization operation so that processors 12 in each of the remote processing nodes 10 can prepare for the TLB synchronization by storing the contents of their respective TLBs to memory. The fourth possible processing scenario occurs when the request transaction cannot be serviced locally (i.e., a remote processing node must be involved), and the request transaction is not Retried at source processing node 10*a*. In this fourth scenario, node controller 20 of source processing node 10*a* will vote ReRun during the ARespOut period, and arbiter 24 will vote ReRun during the ARespIn period, signifying that node controller 20 is responsible for causing the request transaction to be reissued on local interconnect 16 at a later time (i.e., after the request has been processed at one or more remote processing nodes 10 and node controller 20 at source processing node 10*a* has received a response or responses from the remote processing node(s)).

In the operation of NUMA computer systems such as NUMA computer system 8 of FIG. 1, the third and fourth processing scenarios are observed to occur with regularity. Because the communication latency associated with inter-node communication across node interconnect 22 is appreciable compared to the latency of intra-node communication via local interconnect 16, it is desirable to minimize the impact that inter-node communication latency has on the performance of NUMA computer system 8. Thus, in accordance with the present invention, request transactions mastered on local interconnects 16 are speculatively issued on node interconnect 22 prior to determining whether the request transaction can be serviced locally. Speculatively issuing request transactions in this manner overlaps the latency associated with arbitration for node interconnect 22 and transmission of a request transaction via node interconnect 22 with the AStat and AResp determinations at the local processing node 10, thereby decreasing the effective latency of inter-node communication of request transactions.

Accordingly, while the AStat and AResp votes are determined at blocks 80–86 of FIG. 3A, node controller 20 of source processing node 10a arbitrates for ownership of shared address bus 26 by asserting ABR 25, as depicted at block 90 of FIG. 3A and in cycle 3 of FIG. 4. As indicated at block 92 of FIG. 3A, the process then iterates until central arbiter 27 indicates a grant of ownership to node controller 20 by asserting ABG signal 29 during cycle 4. In response to receiving ownership of shared address bus 26, the process illustrated in FIG. 3A proceeds from block 92 to block 94, which illustrates transaction send unit 42 of node controller 20 speculatively issuing the request transaction on node interconnect 22 at least prior to when arbiter 24 provides the ARespIn vote.

The timing relationship between the speculative launch of the request transaction on shared address bus 26 of node interconnect 22 and the generation of the AStatIn and ARespIn votes is implementation-dependent and will depend, for example, on the percentage of AStatIn Retry votes that are anticipated. If AStatIn Retry votes are expected to be statistically infrequent, node controllers 20 are preferably designed to speculatively source transactions on node interconnect 22 prior to the AStatIn period, if permitted by other timing factors such as the arbitration latency associated with central arbiter 27 and the intervals, determined by the communication protocol, between when a processor 12 issues the request transaction on local interconnect 16 and the AStat and AResp periods. In this embodiment of the present invention, block 94 of FIG. 3A represents TSU 42 speculatively issuing a request transaction on node interconnect 22 prior to receipt of the AStatIn vote provided at block 82. Transaction send unit 42 of source processing node 10a determines the target processing node 10 of the request transaction by reference to the address specified in the original request transaction, the memory map allocating the physical address space between processing nodes 10, and coherence directory 50. Once the AStatIn vote for the request transaction is received from arbiter 24, TSU 42 forwards an indication of the AStatIn vote to target processing node 10 via status channel 19, as depicted at block 96. Because it is not important for target processing node 10 to receive the precise AStatIn vote, but only an indication of whether the transaction was correctly received by all snoopers (as indicated by an Null or Ack AStatIn vote) or killed (as indicated by an Error or Retry AStatIn vote) at source processing node 10a, status channel 19 may comprise a single-bit bus through which TSU 42 transmits a valid signal (e.g., a "1") in response to receipt of a Null or Ack AStatIn vote and transmits a kill signal (e.g., a "0") in response to receipt of an Error or Retry AStatIn vote. Thereafter, the process proceeds to block 98, which illustrates node controller 20 of source processing node 10a forwarding the ARespIn coherency response received by the request transaction at source processing 10a to the target processing node 10 via status channel 21. That is, in implementations in which the request transaction is speculatively issued on node interconnect 22 prior to the AStatIn period, both the AStatIn and ARespIn votes are forwarded to the target processing node 10 via status channels 19 and 21, respectively. Accordingly, FIG. 4 depicts the forwarded AStatIn vote using dashed-line illustration to indicate that the AStatIn vote, which would not be forwarded in the exemplary timing scenario, could in other implementations be forwarded an implementation-dependent (e.g., four) cycles after the AStatIn period at source processing node 10a. FIG. 4 further illustrates that the ARespIn vote is forwarded to the target processing node 10 during cycle 11 (i.e., four cycles after the ARespIn period of source processing node 10a) Following the forwarding of the ARespIn coherency vote to target processing node 10, the process depicted in FIG. 3A terminates at block 100.

Referring again to block 94 of FIG. 3A, in alternative embodiments of NUMA computer system 8 in which a statistically significant number of AStatIn Retry votes are expected, node controllers 20 are preferably designed such that transactions are speculatively sourced on node interconnect 22 only after the transaction receives an AStatIn vote other than Retry or Error (as illustrated in FIG. 4). In such embodiments, waiting to speculatively source request transactions until after the AStatIn votes are received advantageously minimizes the number of speculatively sourced transactions that must subsequently be killed at the target processing node 10. In addition, forwarding an indication of the AStatIn vote is unnecessary, and the operation shown at block 96 (as well as status channel 19) can be omitted, as indicated by dashed-line illustration. However, the ARespIn coherency vote is still forwarded to target processing node 10 via status channel 21, as discussed above with respect to block 98. Thereafter, the process terminates at block 100.

Figure 3B:
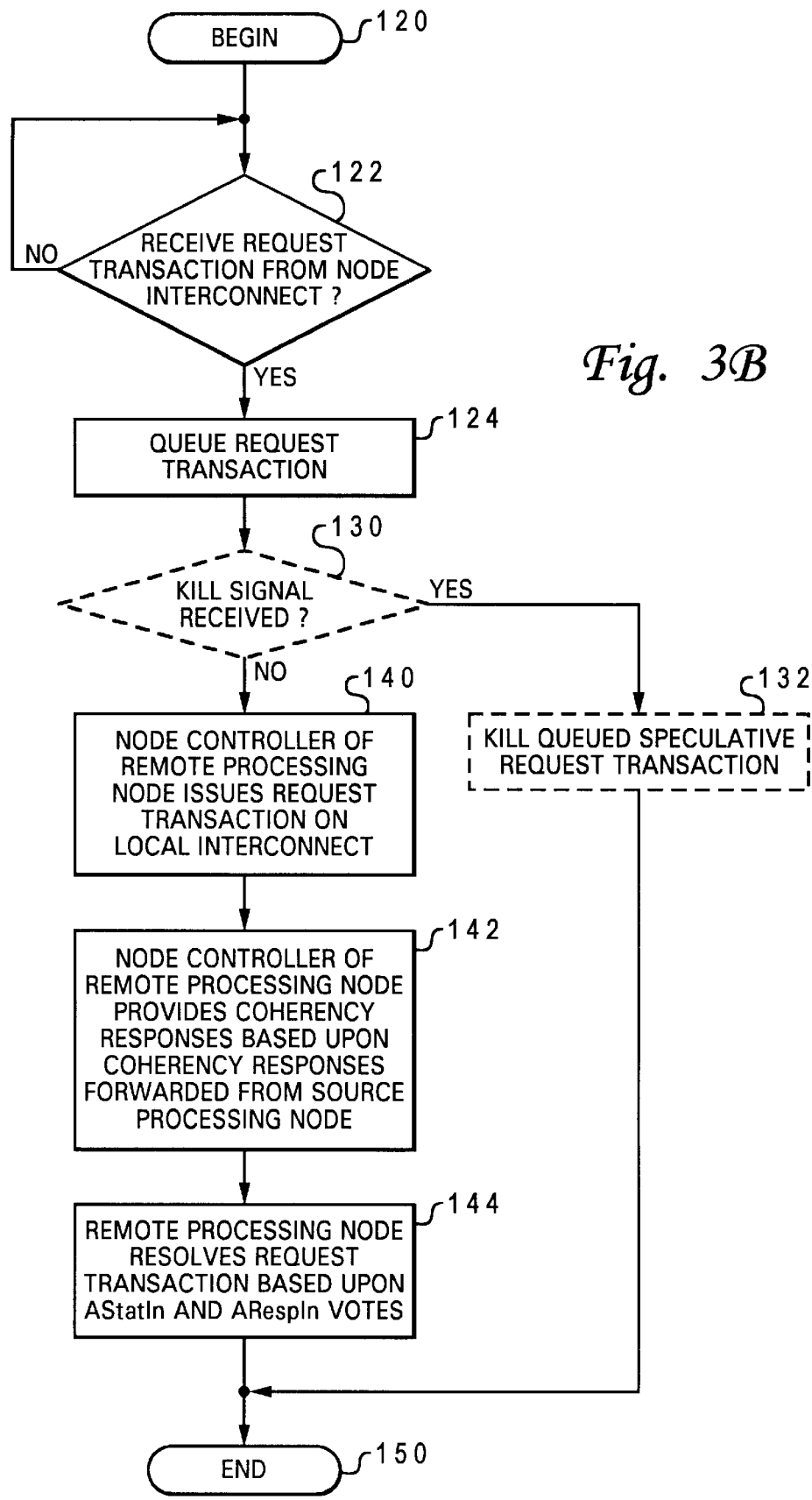
FIG. 3B is a high level logical flowchart of a method for processing a speculatively issued request transaction at a target processing node.

Referring now to FIG. 3B, there is depicted a high level logical flowchart of a method for processing a speculatively issued request transaction at a target processing node in accordance with the present invention. As illustrated, the process begins at block 120 and thereafter proceeds to block 122, which depicts a determination of whether or not node controller 20 of target processing node 10 has received a request transaction via node interconnect 22. If not, the process iterates at block 122 until a request transaction is received. When a request transaction is received at the target processing node 10, the process passes to block 124, which depicts the request transaction passing through response mux 52 of transaction receive unit 40 and being queued so that bus master 54 can later retrieve the request transaction and source it on local interconnect 16 of target processing node 10. As discussed further below, in embodiments that permit speculatively issued request transactions to be killed while enqueued at target processing node 10, each request transaction received by target processing node 10 is preferably queued in association with a temporary ID that indicates the relative order of receipt of the request transactions.

In embodiments of the present invention that permit queued request transactions to be killed, the process then proceeds to block 130, which illustrates a determination of whether or not node controller 20 of target processing node 10 has received a kill signal corresponding to a queued transaction. In the present embodiment, the kill signal referred to at block 130 may be a kill, AStat Retry, or AStat Error signal transmitted via status channel 19 or an AResp Retry signal transmitted via status channel 21. If a kill signal has not been received, the process passes to block 140, which is described below. If, however, a determination is made at block 130 that a kill signal has been received, the process passes to block 132, which illustrates transaction receive unit 40 invalidating the corresponding communication transaction in its internal queues by matching the temporary ID assigned to the kill signal with a temporary ID of an enqueued transaction. By killing request transactions in this manner, unnecessary consumption of the bandwidth of local interconnect 16 of target processing node 10 is avoided. The process then terminates at block 150.

In other embodiments of the present invention that do not permit queued transactions to be killed, for example, due to the timing relationship between the receipt of the status signals from source processing node 10a and the issuance of queued request transactions on local interconnect 16 of target processing node 10, node controller 20 of target processing node 10 manages the processing of a speculatively issued request transaction in the manner illustrated at blocks 140–144. Referring now to block 140, bus master 54 of node controller 20 first sources the speculatively issued request transaction on local interconnect 16 of target processing node 10. Thereafter, as illustrated at block 142, node controller 20 provides appropriate AStatOut and ARespOut votes based upon the status signals forwarded from source processing node 10a. If the ARespIn vote forwarded from source processing node 10a is ReRun, node controller 20 permits the request transaction to proceed by voting Ack during the ARespOut period. Target processing node 10 then services the request at block 144 by issuing a response transaction on node interconnect 22 that includes the requested data. However, if either of the forwarded status signals is a Retry (kill) or the forwarded ARespIn vote is other than ReRun (indicating that the request can be serviced at source processing node 10a), node controller 20 votes Retry during the ARespOut period to end processing of the request transaction at target processing node 10. Thus, as indicated at block 144, the outcome of the AStat and AResp votes at source processing node 10a determines whether the request is serviced by target processing node 10. After the request transaction is either killed or serviced at target processing node 10, the process passes to block 150 and terminates.

As has been described, the present invention provides an improved NUMA computer system and an improved communication methodology in a NUMA computer system. In accordance with the present invention, communication transactions are speculatively issued to a remote target processing node on the node interconnect prior to the completion of the communication transaction on the local interconnect of a source processing node. In this manner, the latency of communication transactions can be dramatically reduced. For example, in the exemplary processing scenario illustrated in FIG. 4, if the transmission of the communication transaction on node interconnect 22 were delayed until after the ARespIn vote of arbiter 24 in cycle 7, grant of node interconnect 22 would not occur until cycle 10, and the communication transaction would not be issued on node interconnect 22 until cycle 11. Thus, the communication transaction would, at the earliest, be issued on local interconnect 16 of remote processing node 10 during cycle 15 and be completed during cycle 21.

While the invention has been particularly shown and described with reference to a preferred embodiment, it will be understood by those skilled in the art that various changes in form and detail may be made therein without departing from the spirit and scope of the invention.

What is claimed is:

1. A computer system, comprising:
   a node interconnect; and
   at least a first processing node and a second processing node that are each coupled to said node interconnect, said first and said second processing nodes each including a local interconnect, a processor coupled to said local interconnect, a system memory coupled to said local interconnect, and a node controller interposed between said local interconnect and said node interconnect, wherein the node controller of said first processing node, responsive to receipt of a request transaction on said local interconnect of said first processing node, said request transaction including an address, decodes said address to identify said second processing node as a target and then speculatively transmits said request transaction to said second processing node via said node interconnect prior to receipt of a local combined coherency response for said request transaction, such that communication latency is reduced.

2. The computer system of claim 1, wherein said node interconnect includes a status channel coupling said first processing node and said second processing node, and wherein said node controller of said first processing node, responsive to receipt of a local response for said speculatively transmitted request transaction indicating that said speculatively transmitted request transaction was not correctly received locally, outputs, via said status channel, a kill signal indicating that a speculatively transmitted request transaction should be killed at said second processing node.

3. The computer system of claim 2, said node controller of said second processing node including means, responsive to receipt of said kill signal, for killing said speculatively transmitted request transaction prior to issuing said speculatively issued request transaction on said local interconnect of said second processing node.

4. The computer system of claim 1, said node controller of said first processing node including means for forwarding, to said second processing node, said local combined coherency response.

5. The computer system of claim 4, said node controller of said second processing node including means for processing said speculatively transmitted request transaction in accordance with said local combined coherency response forwarded from said first processing node.

6. The computer system of claim 1, wherein said speculatively transmitted request transaction comprises a read request.

7. A method of communication in a computer system including a node interconnect that couples at least first and second processing nodes, said method comprising:
   in response to receipt, at a node controller of the first processing node, of a request transaction from a local interconnect of said first processing node, said request transaction including an address, decoding said address to identify said second processing node as a target; and
   thereafter, speculatively transmitting said request transaction to said second processing node via said node interconnect prior to receipt at the node controller of a local combined coherency response of the first processing node for said request transaction.

8. The method of claim 7, said method further comprising:
   in response to receipt, at the node controller of the first processing node, of a status response indicating that said request transaction was not correctly received locally at the first processing node, transmitting, from said first processing node to said second processing node via said node interconnect, a kill signal indicating that said speculatively transmitted request transaction should be killed at said second processing node.

9. The method of claim 8, and further comprising:
   prior to issuing said speculatively issued request transaction on said local interconnect of said second processing node, killing said speculatively transmitted request transaction at said second processing node in response to said kill signal.

10. The method of claim 7, and further comprising forwarding, from said first processing node to said second processing node via said node interconnect, a local combined coherency response to said request transaction received via said local interconnect of said first processing node.

11. The method of claim 10, and further comprising processing said speculatively transmitted request transaction at said second processing node in accordance with said local combined coherency response forwarded from said first processing node.

12. The method of claim 7, wherein speculatively transmitting a request transaction includes speculatively transmitting a read request.

13. The computer system of claim 1, wherein said node controller of said first processing node speculatively transmits said request transaction to said second processing node only in response to receipt of a status response indicating that said request transaction was received correctly locally.

14. The computer system of claim 2, wherein said node controller of said first processing node speculatively transmits said request transaction to said second processing node prior to receipt of a status response indicating that said request transaction was received correctly locally.

15. The computer system of claim 5, wherein said means for processing said speculatively transmitted request transaction comprises means for terminating said speculatively transmitted request transaction at said second processing node in response to receipt of a local combined coherency response other than ReRun.

16. The method of claim 7, wherein speculatively transmitting comprises speculatively transmitting said request transaction from said node controller of said first processing node to said second processing node only in response to receipt of a status response indicating that said request transaction was received correctly locally.

17. The method of claim 8, wherein speculatively transmitting comprises speculatively transmitting said request transaction from said node controller of said first processing node to said second processing node prior to receipt of a status response indicating that said request transaction was received correctly locally.

18. The method of claim 11, wherein processing said speculatively transmitted request transaction comprises terminating said speculatively transmitted request transaction at said second processing node in response to receipt of a local combined coherency response other than ReRun.

* * * * *

UNITED STATES PATENT AND TRADEMARK OFFICE
CERTIFICATE OF CORRECTION

PATENT NO. : 6,081,874
DATED : Jun. 27, 2000
INVENTOR(S) : Carpenter et al.

It is certified that error appears in the above-identified patent and that said Letters Patent are hereby corrected as shown below:

In Col. 6, line 7, please replace "(e.g., 4-1=2)" with -- (e.g., 4-1=3) --.

Signed and Sealed this

First Day of May, 2001

Attest:

NICHOLAS P. GODICI

*Attesting Officer*   *Acting Director of the United States Patent and Trademark Office*